(12) United States Patent
Lin et al.

(10) Patent No.: US 10,836,052 B2
(45) Date of Patent: Nov. 17, 2020

(54) CONNECTION MODULE USING IN ROBOT

(71) Applicant: HIWIN TECHNOLOGIES CORP., Taichung (TW)

(72) Inventors: Jian-An Lin, Taichung (TW); Zhen-Jia Huang, Taichung (TW); Jonus Liu, Taichung (TW); Wu-Teng Hsieh, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 50 days.

(21) Appl. No.: 16/268,962

(22) Filed: Feb. 6, 2019

(65) Prior Publication Data

US 2020/0246984 A1    Aug. 6, 2020

(51) Int. Cl.
| | |
|---|---|
| *B25J 19/00* | (2006.01) |
| *B25J 9/12* | (2006.01) |
| *B25J 18/02* | (2006.01) |
| *B25J 17/02* | (2006.01) |
| *B25J 9/04* | (2006.01) |

(52) U.S. Cl.
CPC ........... *B25J 19/0025* (2013.01); *B25J 9/044* (2013.01); *B25J 9/126* (2013.01); *B25J 17/02* (2013.01); *B25J 17/0258* (2013.01); *B25J 18/02* (2013.01); *B25J 18/025* (2013.01); *B25J 19/0029* (2013.01); *B25J 19/0041* (2013.01)

(58) Field of Classification Search
CPC ..... B25J 9/04; B25J 9/041; B25J 9/042; B25J 9/044; B25J 9/126; B25J 17/02; B25J 17/0258; B25J 18/02; B25J 18/025; B25J 19/0025; B25J 19/0029; B25J 19/0041

USPC ......... 74/490.02, 490.05, 490.06; 901/17, 29
See application file for complete search history.

(56) References Cited

U.S. PATENT DOCUMENTS

| | | | | |
|---|---|---|---|---|
| 4,523,884 A | * | 6/1985 | Clement | ..................... B25J 5/02 414/735 |
| 4,712,972 A | * | 12/1987 | Nakashima | .......... B25J 19/0029 174/69 |
| 5,205,701 A | * | 4/1993 | Kigami | .................. B25J 9/0009 285/305 |
| 5,240,092 A | * | 8/1993 | Eachus | ................ B25J 19/0025 191/12 R |

(Continued)

FOREIGN PATENT DOCUMENTS

| | | |
|---|---|---|
| CN | 204278003 U | 4/2015 |
| CN | 204413478 U | 6/2015 |

(Continued)

*Primary Examiner* — William Kelleher
*Assistant Examiner* — Joseph Brown
(74) *Attorney, Agent, or Firm* — Muncy, Geissler, Olds & Lowe, P.C.

(57) ABSTRACT

A connection module includes a shaft member that can be rotated in place and can be lifted up and down, two wires arranged side by side and spirally wound on the shaft member, and an holder block connected with the bottom end of the shaft member and the bottom end of each wire such that the holder block drives the two wires to expand or to contract along the axial direction of the shaft member or to spiral in the axial direction of the shaft member when the holder block is driven by the shaft member. Thus, the connection module of the present invention can simplify the conventional complicated wiring mode, thereby saving operation space and reducing the risk of line breakage.

3 Claims, 5 Drawing Sheets

(56) References Cited

U.S. PATENT DOCUMENTS

| | | | | |
|---|---|---|---|---|
| 5,410,944 A * | 5/1995 | Cushman | ............ | B25J 9/14 74/490.05 |
| 6,153,828 A * | 11/2000 | Murata | ............ | H02G 11/00 174/50 |
| 7,559,590 B1 * | 7/2009 | Jones | ............ | B25J 19/0025 294/2 |
| 8,376,339 B2 * | 2/2013 | Nagai | ............ | B23K 37/0452 174/69 |
| 2002/0144565 A1 * | 10/2002 | Ambrose | ............ | B25J 19/0025 74/490.03 |
| 2004/0179900 A1 * | 9/2004 | Uematsu | ............ | H02G 11/00 405/183.5 |
| 2007/0031232 A1 * | 2/2007 | Kurebayashi | ............ | B25J 19/0029 414/682 |
| 2008/0148895 A1 * | 6/2008 | Palau | ............ | B25J 19/0029 74/490.02 |
| 2009/0200722 A1 * | 8/2009 | Nakano | ............ | B25J 19/0029 269/61 |
| 2010/0101358 A1 * | 4/2010 | Sendai | ............ | B25J 19/0029 74/490.06 |
| 2010/0313694 A1 * | 12/2010 | Aoki | ............ | B25J 19/0029 74/490.02 |
| 2015/0068350 A1 * | 3/2015 | Kirihara | ............ | B25J 19/0025 74/490.05 |
| 2015/0128748 A1 * | 5/2015 | Rueb | ............ | B25J 19/0041 74/490.02 |
| 2016/0023360 A1 * | 1/2016 | Saito | ............ | B23K 9/133 74/490.04 |
| 2017/0036345 A1 * | 2/2017 | Bordegnoni | ............ | B25J 9/044 |
| 2017/0182658 A1 * | 6/2017 | Bordegnoni | ............ | B25J 9/044 |
| 2017/0182669 A1 * | 6/2017 | Bordegnoni | ............ | B25J 19/0029 |
| 2017/0197319 A1 * | 7/2017 | Cao | ............ | H02K 7/14 |
| 2017/0252931 A1 * | 9/2017 | Zhang | ............ | B25J 17/00 |

FOREIGN PATENT DOCUMENTS

| | | |
|---|---|---|
| JP | H02-311294 A | 12/1990 |
| JP | H08-155880 A | 6/1996 |
| JP | H10-217178 A | 8/1998 |
| JP | H10217178 A | 8/1998 |
| JP | 2008-245390 A | 10/2008 |
| JP | 2008-307636 A | 12/2008 |
| JP | 2018-118334 A | 8/2018 |
| TW | 201823505 A | 7/2018 |
| WO | 2010029670 A1 | 3/2010 |

* cited by examiner

CONNECTION MODULE USING IN ROBOT

BACKGROUND OF THE INVENTION

1. Field of the Invention

The present invention relates to robot arm technology and more particularly, to a connection module using in robot.

2. Description of the Related Art

The robot arm has been widely used in the manufacturing industry at present, which eliminates the problem of yield reduction caused by the execution of highly repetitive workflows on the one hand and replaces the manual work under harsh environmental conditions on the other hand. This prevents the health of the staff from being compromised and maintains good machining accuracy. However, during the manufacturing process, the robot arm is combined with a set of terminal connection modules to match different end effectors (such as jaws, suction cups or drill bits) for processing different sizes of workpieces.

In the case of the conventional wiring configuration, electrical wires are usually bundled and exposed to the outside. Japanese patent No. 1998-217178 uses a plurality of fasteners to secure electrical wires to the shaft in a spiral manner. The installation of external wiring in this way will result in a large operating space around the end connection module, and it is easy to cause interference between the electrical wires and surrounding objects during the operation of the terminal connection module, and even the problem of tangled wires or wire breakage.

SUMMARY OF THE INVENTION

The present invention has been accomplished under the circumstances in view. It is the main object of the present invention to provide a connection module, which simplifies the conventional complicated wiring mode, thereby saving operation space and reducing the risk of line breakage.

To achieve the above objective, the present invention provides a connection module comprising a shaft member, an holder block connected to a bottom end of the shaft member for rotation and lifting along with the shaft member, and an electrical wire set having at least two wires arranged side by side. The electrical wire set is spirally wound on the shaft member and connected to the holder block so that the electrical wire set is driven by the holder block to perform a telescopic movement along the axial direction of the shaft member or to move spirally relative to the axial direction of the shaft member. The electrical wire set produces a maximum diameter when it spirally moves in a first direction. The electrical wire set produces a minimum diameter when it spirally moves in a second direction opposite to the first direction. The minimum diameter is larger than the outer diameter of the shaft member. The maximum diameter and the minimum diameter satisfy the relation of $1.3 < D_{max}/D_{min} < 3.2$, in which $D_{max}$ is the maximum diameter and $D_{min}$ is the minimum diameter.

If $D_{max}/D_{min}$ is less than 1.3, the operating stroke of the electrical wire set will be too long, so that the length of the shaft member and other related components will also be increased, resulting in an increase in cost. If $D_{max}/D_{min}$ is greater than 3.2, the electrical wire set may be interfered with the operation of other components, thereby affecting the working range.

It can be known from the above description that the electrical wire set is wound on the shaft member in a spiral manner, so that the electrical wire set can be stretched, compressed or rotated according to actual needs, thereby achieving the purpose of saving operating space and reducing the risk of line breakage.

Preferably, the maximum diameter is calculated by the formula of $D_{max}=N \times L/[(N-1) \times \pi]+\varnothing$ and the minimum diameter is calculated by the formula of $D_{min}=N \times L/[(N+1) \times \pi]-\varnothing$, in which N is the effective number of turns of the electrical wire set around the shaft member; L is the spiral length of the electrical wire set around the shaft member, $\varnothing$ is the wire diameter of the wire having the largest wire diameter among the electrical wire set; $\pi$ is a pi. The above relationship is used to know the maximum diameter and the minimum diameter of the electrical wire set during the operation, ensuring that the electrical wire set does not affect the operation of other components when expanding or contracting.

Preferably, the connection module further comprises a telescopic sheath mounted around the shaft member to cover the electrical wire set and provided with a bottom end thereof connected to the holder block. Thus, the electrical wire set is hidden in the telescopic sheath, reducing the risk of line breakage.

Other advantages and features of the present invention will be fully understood by reference to the following specification in conjunction with the accompanying drawings, in which like reference signs denote like components of structure.

DETAILED DESCRIPTION OF THE INVENTION

Figure 1:
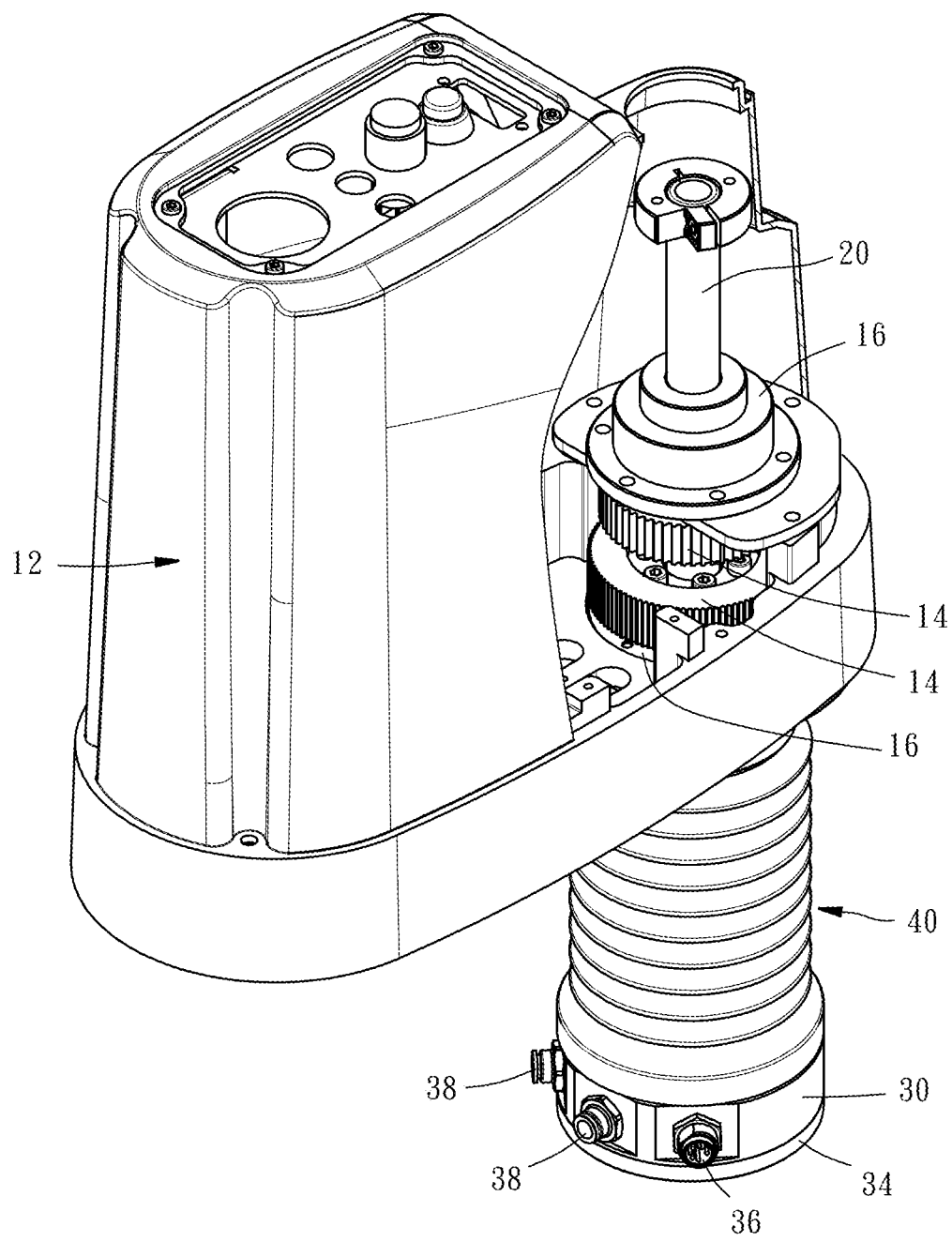
FIG. 1 is a partial sectional view of a robot arm in which a connection module in accordance with the present invention is installed.

The applicant first declares here, in the entire specification, including the preferred embodiment described below and the claims of the present invention, the directional terms are based on the direction in the drawings. In the following preferred embodiment and the annexed drawings, the same reference numerals are used to refer the same or similar elements or structural features thereof.

Figure 2:
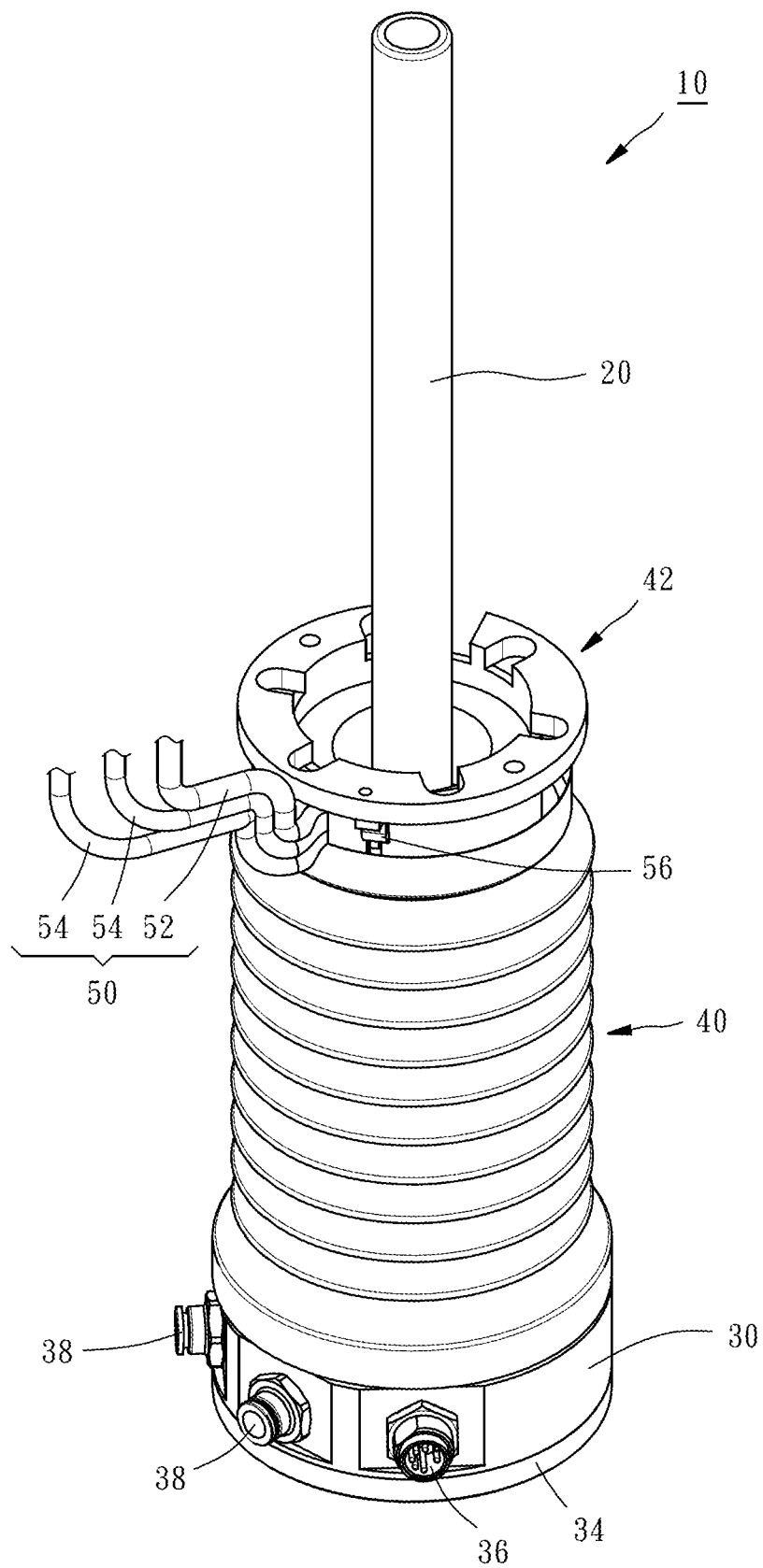
FIG. 2 is a perspective view of the connection module in accordance with the present invention.
Figure 3:
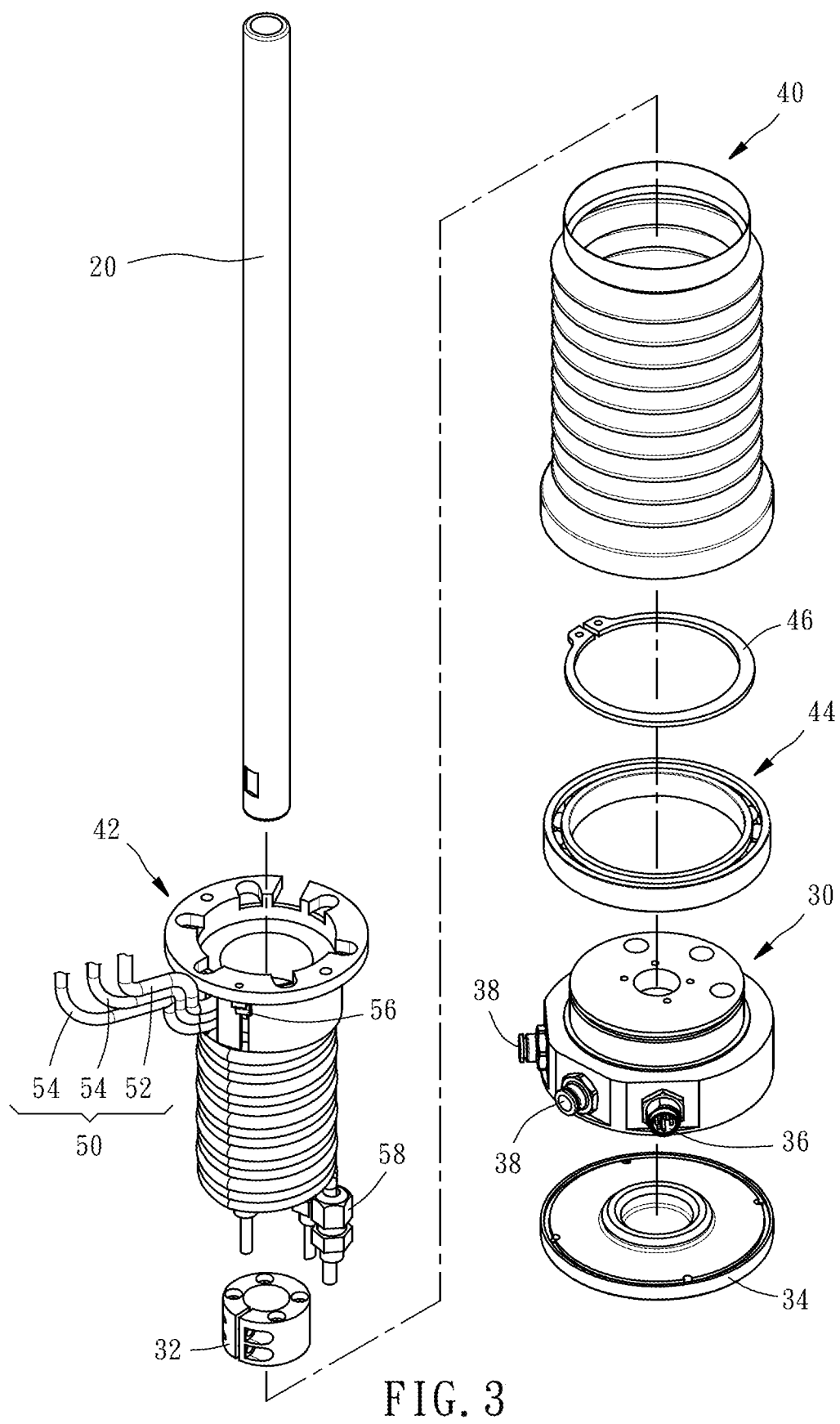
FIG. 3 is an exploded view of the connection module in accordance with the present invention.

Referring to FIG. 1, the configuration of a connection module 10 used in a selective compliance assembly robot arm (SCARA) is shown. Referring to FIGS. 2 and 3, the connection module 10 comprises a shaft member 20, an holder block 30, a telescopic sheath 40, and an electrical wire set 50.

The shaft member 20 is inserted through a casing 12 and assembled with two spline nuts 16 in the casing 12. The two spline nuts 16 are driven by a drive source (such as motor, not shown) through two pulleys 14 respectively, causing the shaft member 20 to rotate and to lift. In this embodiment, the shaft member 20 is a spline shaft. However, the spline shaft design is not a limitation. Other types of shafts can be selectively used. For example, the shaft member 20 can be a shaft of a shaft motor.

The holder block 30 is coupled to the bottom end of the shaft member 20 via a coupling 32 so that the holder block 30 is moved with the shaft member 20. The bottom surface of the holder block 30 is used to assemble a flange 34. The flange 34 can be matched with different end effectors (such as jaws, suction cups or drill bits, not shown) according to actual needs. The outer peripheral surface of the holder block 30 is connected with an electrical output component 36 and two pneumatic output components 38. The electrical output component 36 is used to output electricity to the end effector. One of the pneumatic output components 38 is used to provide an air intake effect to the end effector, and the other pneumatic output component 38 is used to provide an exhaust effect to the end effector.

The telescopic sheath 40 has a top end thereof connected to a pedestal 42 at the top side of the holder block 30, and an opposing bottom end thereof mounted with a ball bearing 44 that is mounted to the holder block 30 using a C-clamp 46. Thereby, when the holder block 30 is rotated, the telescopic sheath 40 is not rotated with the holder block 30. When the holder block 30 is moved up and down, the telescopic sheath 40 will be stretched or compressed together with the holder block 30.

The electrical wire set 50 has at least two wires arranged side by side. In this embodiment, the electrical wire set 50 comprises a first wire 52 and two second wires 54 that have different wire diameters. Alternatively, the first wire 52 and the second wires 54 may have the same wire diameter. In this embodiment, the wire diameter of the first wire 52 is larger than the wire diameter of the second wires 54. The first wire 52 and each of the second wires 54 are wound in a spiral manner on the shaft member 20 and covered by the telescopic sheath 40. Further, the first wire 52 and the second wires 54 have the respective top ends thereof secured to the pedestal 42 using a fastener 56, and the respective bottom ends thereof respectively connected to the holder block 30 by a respective connector 58. Thus, the first wire 52 is connected with the electrical output component 36 to work as an electrical output line, and the two second wires 54 are connected with the two pneumatic output components 38 to work as intake and exhaust lines respectively. Thereby, the electrical wire set 50 will act along with the holder block 30. When the holder block 30 is rotated, the electrical wire set 50 will be moved spirally relative to the axial direction of the shaft member 20. When the holder block 30 is lifted and lowered, the electrical wire set 50 will be expanded and contracted along the axial direction of the shaft member 20.

Figure 4:
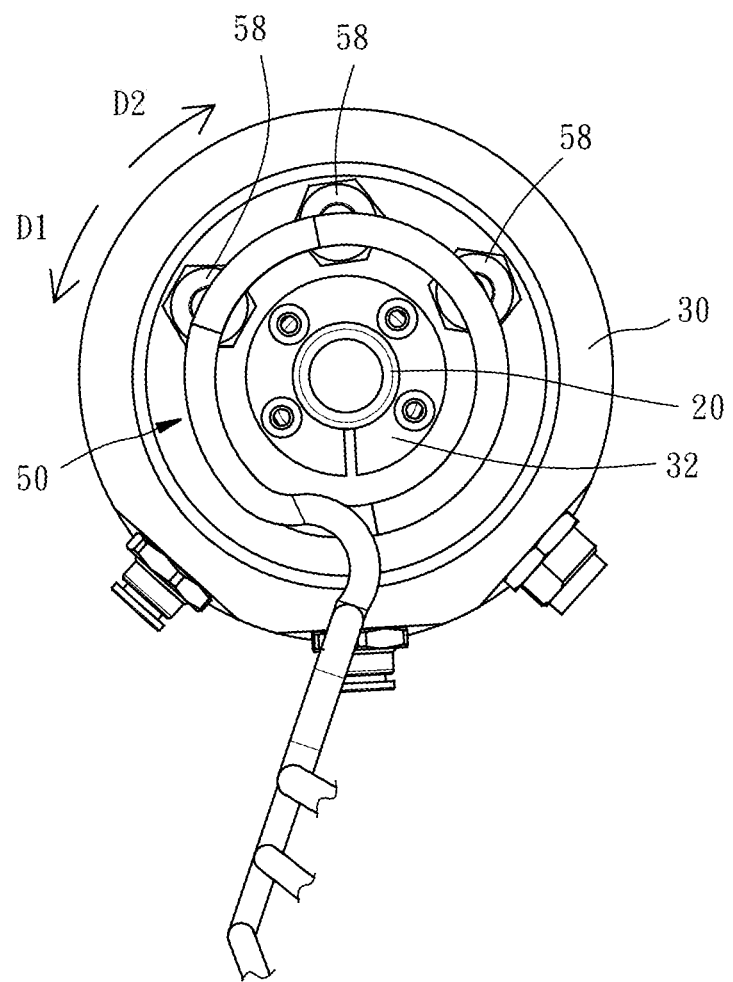
FIG. 4 is a top view of the connection module in accordance with the present invention, in which the telescopic sheath is removed.

Since the respective wires of the electrical wire set 50 are elastic and spirally wound around the shaft member 20 and connected to the holder block 30, when the holder block 30 is rotated by the shaft member 20, each wire of the electrical wire set 50 will be rotated along with the holder block 30 to produce a radial expansion or radial contraction. In order to ensure that the electrical wire set 50 does not affect the operation of other components during expansion or contraction, the electrical wire set 50 has certain limitations in terms of size. In detail, when the electrical wire set 50 is spirally moved in a first direction D1 (in the direction of the arrow shown in FIG. 4), it will be expanded radially to produce a maximum diameter, and the maximum diameter is calculated by the following formula: $D_{max}=N\times L/[(N-1)\times\pi]+\varnothing$; when the electrical wire set 50 is spirally moved in a second direction D2 opposite to the first direction D1 (in the direction of the arrow shown in FIG. 4), it will be contracted radially to produce a minimum diameter, and the minimum diameter is calculated by the following formula: $D_{min}=N\times L/[(N+1)\times\pi]-\varnothing$; wherein N is the effective number of turns of the electrical wire set 50 around the shaft member 20; L is the spiral length of the electrical wire set 50 around the shaft member 20, $\varnothing$ is the wire diameter of the wire having the largest wire diameter among the electrical wire set 50 (in this embodiment, $\varnothing$ is the wire diameter of the first wire 52); $\pi$ is a pi.

Figure 5:
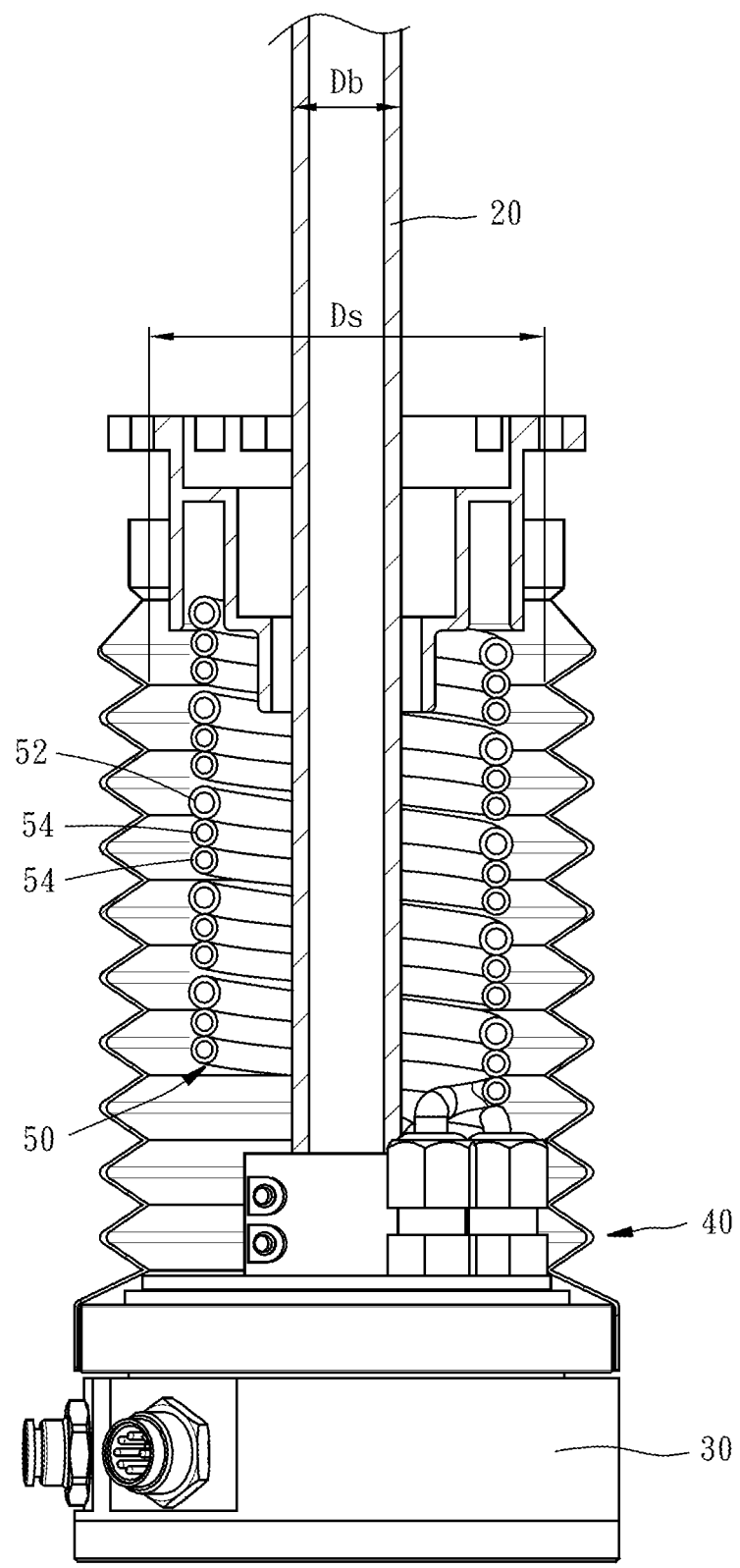
FIG. 5 is a sectional view of the connection module in accordance with the present invention.

As can be seen from the above, as shown in FIG. 5, the maximum diameter $D_{max}$ of the electrical wire set 50 is smaller than the inner diameter $D_s$ of the telescopic sheath 40, so as to prevent the electrical wire set 50 from interfering with the telescopic sheath 40 when radially expanding; the minimum diameter $D_{min}$ of the electrical wire set 50 is larger than the outer diameter $D_b$ of the telescopic sheath 40, so as to prevent the electrical wire set 50 from interfering with the shaft member 20 when radially contracting. In this way, the electrical wire set 50 can overcome the action requirement of the robot arm and keep the electricity output normally and stably. In addition, the following relation is further satisfied between the maximum diameter $D_{max}$ and the minimum diameter D $1.3<D_{max}/D_{min}<3.2$. If the aforementioned ratio is less than 1.3, the operating stroke of the electrical wire set 50 will be too long, so that the length of the shaft member 20 and other related components will be also increased, resulting in an increase in cost. If the aforementioned ratio is greater than 3.2, the electrical wire set 50 may be interfered with the operation of other components (such as end effector or other axial arms), thereby affecting the working range.

In summary, the connection module 10 of the present invention winds the electrical wire set 50 in a spiral manner around the shaft member 20 and is combined with a special size design so that the electrical wire set 50 can be stretched, compressed or rotated according to actual needs, thereby achieving the purpose of saving operating space and reducing the risk of line breakage.

What is claimed is:

1. A connection module comprising:
   a shaft member;
   a holder block connected to a bottom end of said shaft member for rotation and lifting along with said shaft member; and
   an electrical wire set having at least two wires arranged side by side, said electrical wire set being spirally wound on said shaft member and connected to said holder block so that said electrical wire set is drivable by said holder block to perform a telescopic movement along an axial direction of said shaft member or to move spirally relative to the axial direction of said shaft member, said electrical wire set producing a maximum diameter when said electrical wire set is moved spirally in a first direction, said electrical wire set producing a minimum diameter when said electrical wire set is spirally moved in a second direction opposite to said first direction, said minimum diameter being larger than an outer diameter of said shaft member, said maximum diameter and said minimum diameter satisfying the relation of $1.3<D_{max}/D_{min}<3.2$, in which $D_{max}$ is said maximum diameter and $D_{min}$, is said minimum diameter,
   wherein said maximum diameter is calculated by the formula of $D_{max}=N\times L/[N-1)\times\pi]+\varnothing$ and said minimum diameter is calculated by the formula of $D_{min}=N\times L/[(N+1)\times\pi]-\varnothing$, in which N is a number of turns of said electrical wire set around said shaft member; L is a spiral length of said electrical wire set around said shaft member, Ø is a wire diameter of a wire having a largest wire diameter among said electrical wire set: $\pi$ is a pi.

2. The connection module as claimed in claim 1, wherein said electrical wire set comprises a first wire and two second wires; a wire diameter of said first wire is larger than a wire diameter of each said second wire; Ø is the wire diameter of said first wire.

3. The connection module as claimed in claim 1, further comprising a telescopic sheath mounted around said shaft member to cover said electrical wire set and having a bottom end thereof connected to said holder block; said maximum diameter is smaller than an inner diameter of said telescopic sheath.

* * * * *